US011898963B2

(12) United States Patent
Pruneri et al.

(10) Patent No.: US 11,898,963 B2
(45) Date of Patent: Feb. 13, 2024

(54) IDENTIFYING 3D OBJECTS

(71) Applicants: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

(72) Inventors: Valerio Pruneri, Barcelona (ES); Mehmet Alican Noyan, Barcelona (ES); Anatoly Grudinin, Barcelona (ES)

(73) Assignees: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 0 days.

(21) Appl. No.: 18/250,757

(22) PCT Filed: Dec. 8, 2021

(86) PCT No.: PCT/EP2021/084839
§ 371 (c)(1),
(2) Date: Apr. 27, 2023

(87) PCT Pub. No.: WO2022/122847
PCT Pub. Date: Jun. 16, 2022

(65) Prior Publication Data
US 2023/0393078 A1    Dec. 7, 2023

(30) Foreign Application Priority Data
Dec. 9, 2020   (EP) .................................... 20383072

(51) Int. Cl.
*G01N 21/87* (2006.01)
*G01N 21/88* (2006.01)
(Continued)

(52) U.S. Cl.
CPC ......... *G01N 21/87* (2013.01); *G01N 21/3563* (2013.01); *G01N 21/8851* (2013.01);
(Continued)

(58) Field of Classification Search
CPC ..... G01N 21/87; G01N 21/3563; G06N 3/045
See application file for complete search history.

(56) References Cited

U.S. PATENT DOCUMENTS

| 4,125,770 A | 11/1978 | Lang |
| 7,557,917 B1 | 7/2009 | Beesley |

(Continued)

FOREIGN PATENT DOCUMENTS

| EP | 1630549 A1 | 3/2006 |
| WO | WO 03/099054 A2 | 12/2003 |
| WO | WO 2020/074864 A1 | 4/2020 |

OTHER PUBLICATIONS

"2 Siamese Neural Network: The Architecture", Marine Genomics: Methods and Protocols, vol. 2190.
(Continued)

*Primary Examiner* — Hugh Maupin
(74) *Attorney, Agent, or Firm* — Dority & Manning, P.A.

(57) ABSTRACT

Identifying 3D objects A method for identification of 3D objects comprises illuminating at least part of a 3D object with electromagnetic radiation, spectroscopically obtaining spectral data for one or more regions of the 3D object, and generating, at a data processing apparatus, an identification result for the 3D object using a trained machine learning model. The trained machine learning model processes the obtained spectral data for the one or more regions to generate one or more model outputs from which the identification result is derived.

8 Claims, 9 Drawing Sheets

(51) Int. Cl.
  *G06N 3/045* (2023.01)
  *G01N 21/3563* (2014.01)
  *G01N 21/35* (2014.01)

(52) U.S. Cl.
  CPC ..... *G06N 3/045* (2023.01); *G01N 2021/3595* (2013.01); *G01N 2021/8883* (2013.01)

(56) References Cited

U.S. PATENT DOCUMENTS

| | | | |
|---|---|---|---|
| 8,834,177 | B2 | 9/2014 | Lapa et al. |
| 9,063,085 | B2 | 6/2015 | McManus et al. |
| 2003/0223054 | A1 | 12/2003 | Warwick |
| 2009/0182520 | A1 | 7/2009 | Luxembourg et al. |
| 2014/0268133 | A1 | 9/2014 | McManus et al. |
| 2018/0342053 | A1* | 11/2018 | Balagurusamy .......... G06T 7/13 |
| 2020/0202045 | A1* | 6/2020 | Mehr ..................... G06F 30/27 |
| 2021/0027447 | A1 | 1/2021 | Parikh et al. |
| 2021/0302322 | A1* | 9/2021 | Tsai .......................... G01J 3/06 |

OTHER PUBLICATIONS

Abduriyim et al, "Applications of Laser Ablation—Inductively Coupled Plasma—Mass Spectrometry", Gems & Gemology, vol. 42, No. 2, 2006, pp. 98-118.

Diehl et al, "X-Ray Fingerprinting Routine for Cut Diamonds", Gem & Gemology, vol. 40, No. 1, 2004, pp. 40-57.

Díez-Pastor, et al, "Machine learning algorithms applied to Raman spectra for the identification of variscite originating from the mining complex of Gavà", Journal of Raman Spectroscopy, vol. 51, 2020, p. 1563-1574.

Downs, "The RRUFF Project: An Integrated Study of theChemistry, Crystallography, Raman and Infrared Spectroscopy of Minerals", Program and Abstracts of the 19th General Meeting of the International Mineralogical Association, Kobe, Japan, Jul. 23-28, Abstract 90261.

Ellis et al, "A New Method for Determining the Concentration of Electrolyte Components in Lithium-Ion Cells, Using Fourier Transform Infrared Spectroscopy and Machine Learning", Journal of the Electrochemical Society, 2018, vol. 165, No. 2, 8 pages.

Emmett et al, "Beryllium Diffusion of Ruby and Sapphire", Gems & Gemology, vol. 39, No. 2, 2003, p. 84-135.

Erasmus et al, "Natural Diamonds—Major, Minor and Trace Impurities in Relation to Source and Physical Properties", Journal of Radioanalytical Chemistry, vol. 38, 1977, pp. 133-146.

Graser et al, "Machine Learning and Energy Minimization Approaches for Crystal Structure Predictions: A Review and New Horizons", Chemistry of Materials, 2018, 23 pages.

Hadsell et al, "Dimensionality Reduction by Learning an Invariant Mapping", Conference on Computer Vision and Pattern Recognition, Jun. 17-22, 2006, New York, New York, United States, 8 pages.

International Search Report and Written Opinion for PCT/EP2021/084839, dated Mar. 18, 2022, 16 pages.

Kaiser et al, "Nitrogen, A Major Impurity in Common Type I Diamond", Physical Review, vol. 115, No. 4, Aug. 15, 1959, 7 pages.

Karampelas et al, X-Ray Computed Microtomography Applied to Pearls: Methodology, Advantages, and Limitations. Gems & Gemology, vol. 46, No. 2, 2010, pp. 122-127.

Kedzierski et al, "A Machine Learning Algorithm for High Throughput Identification of FTIR Spectra: Application on Microplastics Collected in the Mediterranean Sea", Chemosphere, Nov. 2019, vol. 234, 29 pages.

Krzemnicki et al, "A New Method for Detecting Be Diffusion-Treated Sapphires: Laser-Induced Breakdown Spectroscopy (LIBS)", Gems & Gemology, vol. 40, No. 4, pp. 314-322.

Krzemnicki M.S., Steinacher M., Herzog F. (2009b) Portable UV-Vis spectrometer. SSEF Instruments, www.ssef.ch/en/news/archive/EGS2009_Portable_Uvvis.pdf [date accessed: Jun. 5, 2010].

Ren et al, "Diamond Color Grading Based on Machine Vision", International Conference on Computer Vision Workshop, Sep. 27-Oct. 4, 2009, Kyoto, Japan, pp. 1970-1976.

Sarine Diamond Technologies—A World Leader in the Diamond Industry, www.sarine.com, retrieved on Jun. 1, 2023, 7 pages.

\* cited by examiner

|     | s0  | s1  | s2  | s11 | s12 | s21 | s22 | S3  |
|-----|-----|-----|-----|-----|-----|-----|-----|-----|
| s0  |     |     |     |     |     |     |     |     |
| s1  |     |     |     |     |     |     |     |     |
| s2  |     |     |     |     |     |     |     |     |
| s11 |     |     |     |     |     |     |     |     |
| s12 |     |     |     |     |     |     |     |     |
| s21 |     |     |     |     |     |     |     |     |
| s22 |     |     |     |     |     |     |     |     |
| S3  |     |     |     |     |     |     |     |     |

FIG. 9A

|     | s0  | s1  | s2  | s11 | s12 | s21 | s22 | S3  |
|-----|-----|-----|-----|-----|-----|-----|-----|-----|
| s0  | 100 | 80  | 80  | 40  | 40  | 40  | 40  | 0   |
| s1  | 80  | 100 | 80  | 80  | 80  | 60  | 60  | 0   |
| s2  | 80  | 80  | 100 | 60  | 60  | 80  | 80  | 0   |
| s11 | 40  | 80  | 60  | 100 | 80  | 60  | 60  | 0   |
| s12 | 40  | 80  | 60  | 80  | 100 | 60  | 60  | 0   |
| s21 | 40  | 60  | 80  | 60  | 60  | 100 | 80  | 0   |
| s22 | 40  | 60  | 80  | 60  | 60  | 80  | 100 | 0   |
| S3  | 0   | 0   | 0   | 0   | 0   | 0   | 0   | 100 |

FIG. 9B

IDENTIFYING 3D OBJECTS

CROSS REFERENCE TO RELATED APPLICATIONS

This application is the U.S. National Stage entry of International Application No. PCT/EP2021/084839, filed on Dec. 8, 2021, which, in turn, claims priority to European Patent Application No. 20383072.4, filed on Dec. 9, 2020, both of which are hereby incorporated herein by reference in their entireties for all purposes.

FIELD

The specification relates to a method and apparatus for identification of 3D objects based on spectroscopy and machine learning. It also relates to a computer-implemented method of training a machine learning model to identify 3D objects using spectral data. The 3D object may be a gemstone such as a diamond.

BACKGROUND

Identification of physical objects is important in various industries. For example, in the gemstone industry, the market has in recent years been flooded with gemstones of unclear history and of questionable origin. Moreover illegal appropriation of gemstones (and diamonds in particular) at various points of their production from source mine to final product is a significant problem. All of this makes the problem of gemstone identification at "point of birth" with subsequent traceability throughout the entire production process of gemstone evolution from a rough gemstone to a finished article a highly important one.

SUMMARY

The present specification describes a method for identification of 3D objects. The method comprises illuminating at least part of a 3D object with electromagnetic radiation, and spectroscopically obtaining spectral data for one or more regions of the 3D object. The method further comprises generating, at a data processing apparatus, an identification result for the 3D object using a trained machine learning model, comprising processing the obtained spectral data for the one or more regions using the trained machine learning model to generate one or more model outputs from which the identification result is derived.

The method may be advantageously applied to gemstone (e.g. diamond) identification. It allows identification of diamonds (or other gemstones) irrespective of their surface quality, e.g. whether they are rough or polished. Due to its non-invasive nature the method thus provides a way to unambiguously establish links between a gemstone at different processing stages during a production cycle where a rough sample is converted into a polished one. Furthermore, identification result(s) obtained by the method may establish the relationship between gemstones and may allow a "family tree" to be constructed based on an original raw gemstone which was subsequently cut into a number of smaller units. In this way, techniques described in this specification allow traceability of diamonds or other gemstones throughout the entire gemstone production and distribution process.

Spectroscopically obtaining spectral data for a region of the 3D object may comprise obtaining spectral data for electromagnetic radiation transmitted by, scattered by, or reflected from the region. Alternatively, spectroscopically obtaining spectral data for a region may comprise obtaining spectral data for luminescence (for example fluorescence) from the region due to its illumination by electromagnetic radiation. Further alternatively, spectroscopically obtaining spectral data may comprise obtaining spectral data for inelastically scattered electromagnetic radiation generated by a nonlinear process (e.g. a Raman process or harmonic generation) which occurs in the region due to its illumination by electromagnetic radiation.

A plurality of spectral data sets may be obtained for a plurality of respective regions of the 3D object. The identification result may be generated by comparing each of the plurality of obtained spectral data sets with a plurality of stored data sets for a plurality of respective regions of a reference 3D object. In particular, the identification result may be obtained by combining these comparisons, e.g. by averaging the comparisons.

More generally, the identification result may provide a measure of the extent to which the 3D object is related to (e.g. similar to or the same as) the reference 3D object, based on the spectral comparison(s). For example, the identification result may comprise an identification score based on the spectral comparison(s). The identification score may quantify a degree of similarity between the 3D object and the reference 3D object based on the spectral comparison(s).

The machine learning model may comprise a neural network model such as a Siamese neural network model.

The Siamese neural network may comprise a first set of one or more neural network layers for processing the spectral data to determine a latent space representation of the spectral data, and a second set of one or more neural network layers for processing further spectral data to determine a latent space representation for the further spectral data, wherein generating the identification result comprises determining a measure of distance between the latent space representation of the spectral data and the latent space representation of the further spectral data. The first and/or second sets of neural network layers may comprise feed-forward and/or convolutional layers.

The method may comprise generating a plurality of identification results for the 3D object relative to a respective plurality of reference 3D objects using the trained machine learning model, wherein generating each identification result comprises comparing the obtained spectral data with respective stored spectral data for the respective reference 3D object using the trained machine learning model, thereby identifying the extent to which the 3D object is related to the plurality of reference 3D objects.

The 3D object may comprise a material which is transparent to the electromagnetic radiation. The 3D object may comprise a gemstone such as a diamond.

This specification also describes an apparatus for identifying 3D objects, comprising: a spectroscopy arrangement to obtain spectral data for one or more regions of a 3D object, the spectroscopy arrangement including a source of electromagnetic radiation configured for illuminating at least part of a 3D object. The apparatus further comprises one or more computer-readable media storing a trained machine learning model configured to process the generated spectral data for the one or more regions and to thereby generate one or more model outputs from which an identification result is derived, and computer readable instructions, which when executed by one or more processors, generate the identification result using the trained machine learning model.

The source may comprise a broadband source. The spectroscopy arrangement may include a spectrum analyser to obtain the spectral data for the one or more regions of the 3D object.

The spectroscopy arrangement may be configured to obtain the spectral data using Fourier Transform spectrometry.

The electromagnetic radiation may comprise mid-infrared light which may for example comprise one or more wavelengths in the range 2 μm to 12 μm.

In some cases, the electromagnetic radiation may comprise visible light, for example in embodiments in which luminescence spectra are acquired. In some cases, the electromagnetic radiation may comprise near-infrared light, for example in cases in which spectra from second (or higher) harmonic generation processes are acquired.

As used herein, the term "spectroscopy" refers to techniques which analyse the interaction between electromagnetic radiation and a 3D object as a function of wavelength or frequency. Such interaction may include for example, reflection, absorption, luminescence, elastic or inelastic scattering etc. In some examples, a spectroscopy arrangement may analyse the spectrum of electromagnetic radiation after interaction with the 3D object in order to determine spectral data, for example by using a spectrometer. However, in other examples, a spectrometer is not used; instead spectral data is obtained by varying the wavelength of the source of electromagnetic radiation (e.g. a tunable laser), and a detector is used to detect the intensity of the electromagnetic radiation at each wavelength, after it has interacted with the 3D object. It will be understood that the term "spectroscopically" refers to use of a spectroscopy technique.

The specification also describes a method of training a machine learning model for use in 3D object identification, comprising: providing training data comprising a plurality of training data items, each training data item including: a pair of measurements selected from a set of a measurements, each measurement in the set of measurements comprising spectral data obtained for one of a plurality of 3D objects, and a label indicating a relationship between the pair of 3D objects corresponding to the pair of measurements. The method further comprises processing, at one or more processors, the pairs of measurements included in the training data items using the machine learning model to generate a predicted output for each training data item, and adjusting, at the one or more processors, parameters of the machine learning model based on a loss function, wherein the loss function comprises a comparison between the predicted output for each training data item and the label for that training data item.

BRIEF DESCRIPTION OF THE FIGURES

So that the subject matter of this specification may be more easily understood, examples embodiments thereof will now be described with reference to the accompanying drawings in which:

FIGS. 9(A) and 9(B) show a matching table, and

DETAILED DESCRIPTION

Figure 1A:
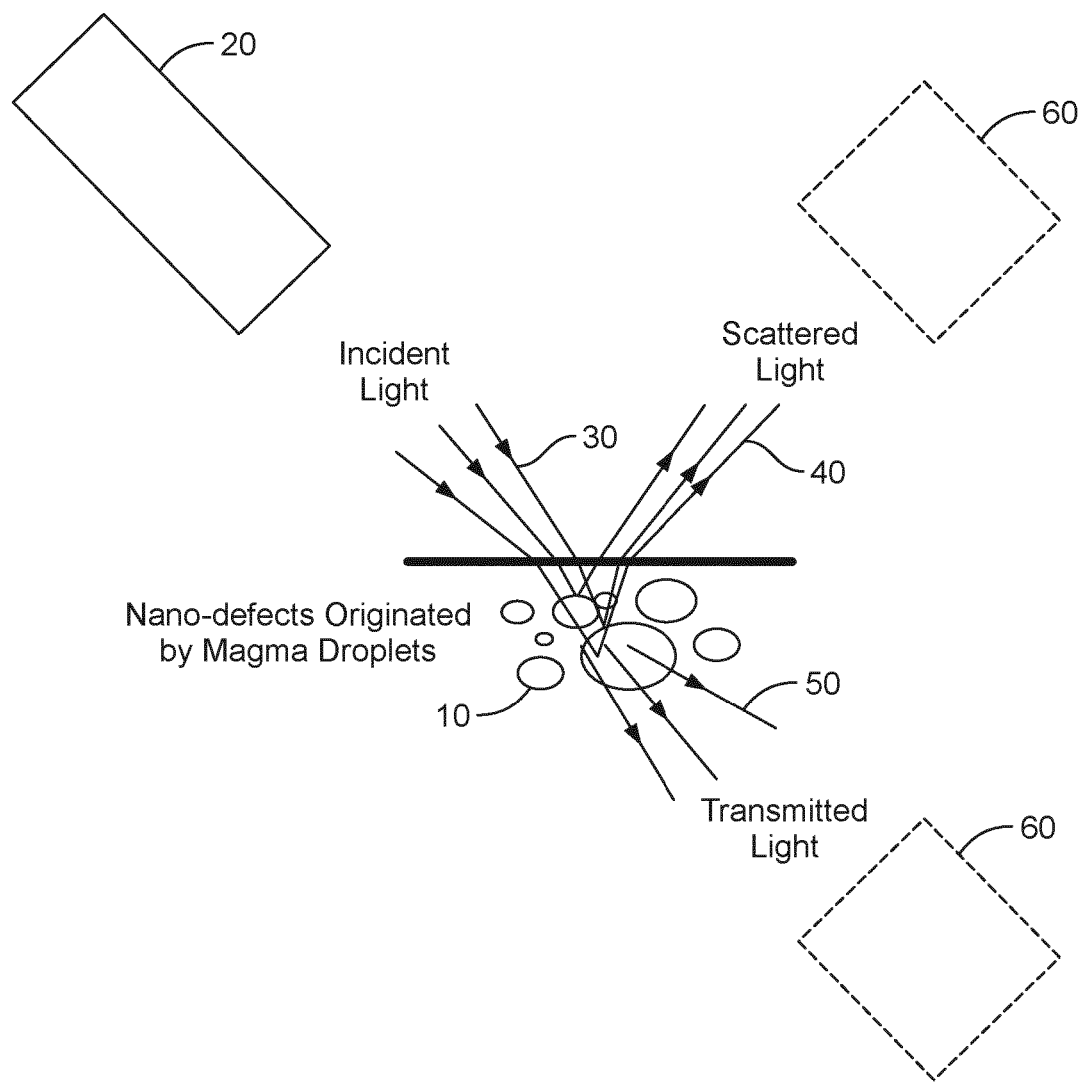
FIG. 1(A) is a schematic illustration of an optical arrangement for obtaining spectra data from a gemstone.

Various example implementations described in this specification relate to a method for identifying 3D-objects using computer-aided spatially distributed spectral analysis. The method may involve multiple spectral measurements at various points of a given 3D object so that a 3D map of the distributed spectral data can be constructed. The constructed 3D map acts as a "fingerprint" which can be distinguished from a "fingerprint" of another object using a neural network trained for this purpose. In various example implementations, identifying a given object may involve performing only a limited number of spectral measurements and then using the trained neural network to identify the object with an identification accuracy which may in some cases be greater than 99.9%.

In one implementation, the method includes (i) acquisition of multiple spectra (e.g. absorption, reflection or luminescence spectra or frequency converted spectra due to nonlinear interaction) from different probe volumes and (ii) analysis of the recorded data using an algorithm based on neural networks trained such that the "distance" between measurements for the same 3D object are minimised while the "distance" between measurements for different 3D objects are maximised. In this way, techniques described in this specification provide for enhanced identification through detection of small spectral differences which may be indiscernible by other methods.

The method may be advantageously applied to gemstone (e.g. diamond) identification as it allows the initial creation of a 3D spectral map of rough gemstone extracted from the mine pit and then to trace not only the entire gemstone through the production process but also to identify and trace its cut-outs.

Reference herein to identifying (or identification of) a 3D object herein should not understood as being limited to identifying that the 3D object is the same as a known object, and may include identifying that the object is associated with another object (for example identifying that a cut diamond is related to a particular original rough gemstone), or identifying that the object belongs to a particular class of objects (e.g. to a family of cuts from raw gemstone). Such a class of objects may be related in that, for example, they share a common origin and consequentially have one or more similar physical properties which can be detected by techniques described herein. As described in more detail below, in various embodiments the method may produce an identification result which identifies a degree of similarity between the 3D object and a reference object, thereby quantifying the extent to which they are related.

Since the described techniques find particular utility and advantage in the context of gemstone (e.g. diamond) identification, a particular example implementation will now be described in that context. However it will be understood that this specification is not limited to identification of gemstones and various other types of 3D object may be identified using the techniques described herein.

It is now widely accepted that all natural diamonds contain sub-microscopic inclusions with a common composition chemistry reflecting that of the magma from which diamonds are believed to have crystallised. The ubiquitous sub-$\mu$m inclusions could well be quenched or re-equilibrated magma droplets which were trapped during diamond growth. For this reason, natural diamond may contain defects formed by atoms of nitrogen or hydrogen substituting atoms of carbon and impurities of sub-micrometre scale containing chemical elements such as boron, phosphorous, chromium and many others.

Each of the above chemical elements has its own, very often unique light absorption spectrum and therefore optical spectra of gemstones in general and diamonds in particular strongly depend on the chemical composition of impurities and defects in the crystal lattice. Since the detailed chemical composition of magma droplets is largely random, it would be reasonable to assume that every raw gemstone has its own and unique optical spectrum associated with slightly different content of the magma droplets. It would be also reasonable to assume that the chemical composition of the droplets marginally varies across individual gemstones and the bigger the gemstone the bigger the variation of the chemical content.

In fact it was noted in Erasmus C. S., et all "Natural diamonds—major, minor and trace impurities in relation to source and physical properties" (J. of Radioanalytical Chemistry, 38 (1977) 133) that there is certain correlation between impurity chemistry and source or origin of diamonds.

However not only the visible optical response (colour) is modified by impurities. The infrared absorption spectra is also affected by impurities and can thus contain information of not only the origin of a particular gemstone but could also be considered as a unique signature of this gemstone. Identification is thus possible, provided that the accuracy of spectral measurements is high enough and the data acquisition and analysis method is capable of both handling big volumes of raw data and detection of small differences in what may otherwise appear to be identical spectra.

Recently, a number of commercial Fourier transform infrared spectroscopy (FTIR) systems have been customised specifically for gemstone inspection such as described in U.S. Pat. No. 4,125,770 and international patent publication WO 03/099054. In general, the spectra is taken for essentially the whole volume of the gemstone or a limited region probe volume, the latter typically with the use of a microscope accessory. Although those instruments and methods are capable of characterising gemstones to some extent, accuracy is not high enough for identification of individual gemstones. Since the signal comes from the whole volume of the gemstone, such signal is an average of contributions from different regions of the whole volume. Therefore, although gemstones are different with different contributions from different regions they may still generate a practically indistinguishable average signal.

Another way of understanding this is to consider that fingerprint signals from specific regions of a gemstone may be "washed out" and become less detectable because of signal contributions from other regions of the gemstones not containing such fingerprints. On the other hand, if only a limited volume is probed, this may not include the defects fingerprints that distinguish the gemstone. In other words, in both cases (the entire and limited probe volume) two gemstones may not be distinguishable using spectroscopic means such as FTIR, at least partially because defects and inclusions generating signals with characteristic fingerprints (identification signatures), are not uniformly distributed.

A similar issue occurs when trying to identify the provenance of a gemstone. For example, imagine an initial gemstone divided into pieces. On the one hand, each piece may generate an average signal for the whole volume with different fingerprints from that of the original parent gemstone. On the other hand, if only a limited volume is probed, only the pieces containing a portion of the limited volume may generate a similar signal.

To address the aforesaid problems, some implementations described in this specification describe the use of multiple spectral measurements at different locations (different probe volumes distributed over the entire volume) of the same gemstone so as to construct a spatial spectral 3D map, and then using machine learning to identify gemstones from a given database by its spectral characteristics. By providing a 3D map of multiple probe volumes as described herein, it is possible to overcome the identification issues of "whole volume" and "limited volume" probing described above. In particular, this maintains the high signal quality of the case of limited probe volume including the defect or inclusion generating fingerprint while also taking advantage of information from a large volume of the gems, reducing in this way the probability of missing fingerprint signals. It is thus more suitable for identification of a gemstone including determining its provenance. With respect to determining provenance, consider a gemstone divided into pieces. If the parent gemstone has been probed in a sufficiently large number of specific limited volumes, the likelihood that each piece contains at least a fingerprinting signature that was detected in the parent gemstone is high In various implementations described in this specification, acquisition on multiple (e.g. absorption) spectra from different probe volumes is combined with detection of small spectral differences through the use of a neural network, to provide accurate and non-invasive gemstone identification.

It should be noted that absorption can affect both reflected light scattered from the gemstone and transmission light through the gemstone. Therefore reflected scattered light, transmitted light or both can be used to record the spatial absorption map of the gemstone. In a more specific case, it is known to a skilled person in the art that reflecting the light at the back surface of an object is equivalent to measure in double pass transmission, apart from scattered reflected light collected at the same time. For creating the map, different techniques can be used, from translating the relative position of the gemstone with respect to a limited spot size beam, to rotating the gemstones with respect to a beam that is mainly scattered by a layer under the surface, or a beam interacting with the entire gemstone thickness and using apertures for achieving a spatially selected mapping.

Unlike many other methods the approach described in this specification does not change the internal structure or shape of a gemstone and does not create new defects. It is very fast and suitable for both mine pit environment and high street outlets. Using this method it is possible to trace gemstone evolution from raw gemstone extracted from a mine pit to a finished polished article embedded into a suitable frame.

Further, it allows a family tree to be developed based on an original large raw gemstone which was subsequently cut into a number of smaller units as described in more detail below.

Data Acquisition

Figure 2A:
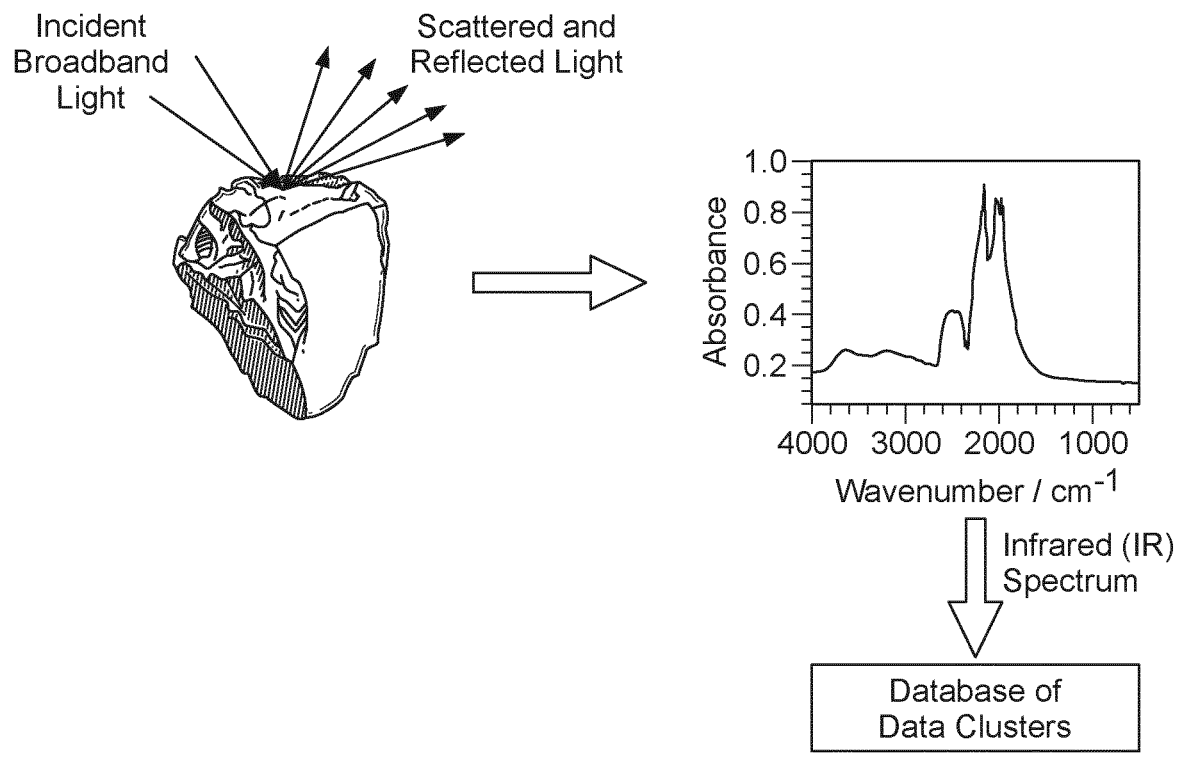
FIGS. 2(A) and 2(B) illustrate a Fourier-transform infrared spectroscopy method in transmission and reflection mode respectively.
Figure 2B:
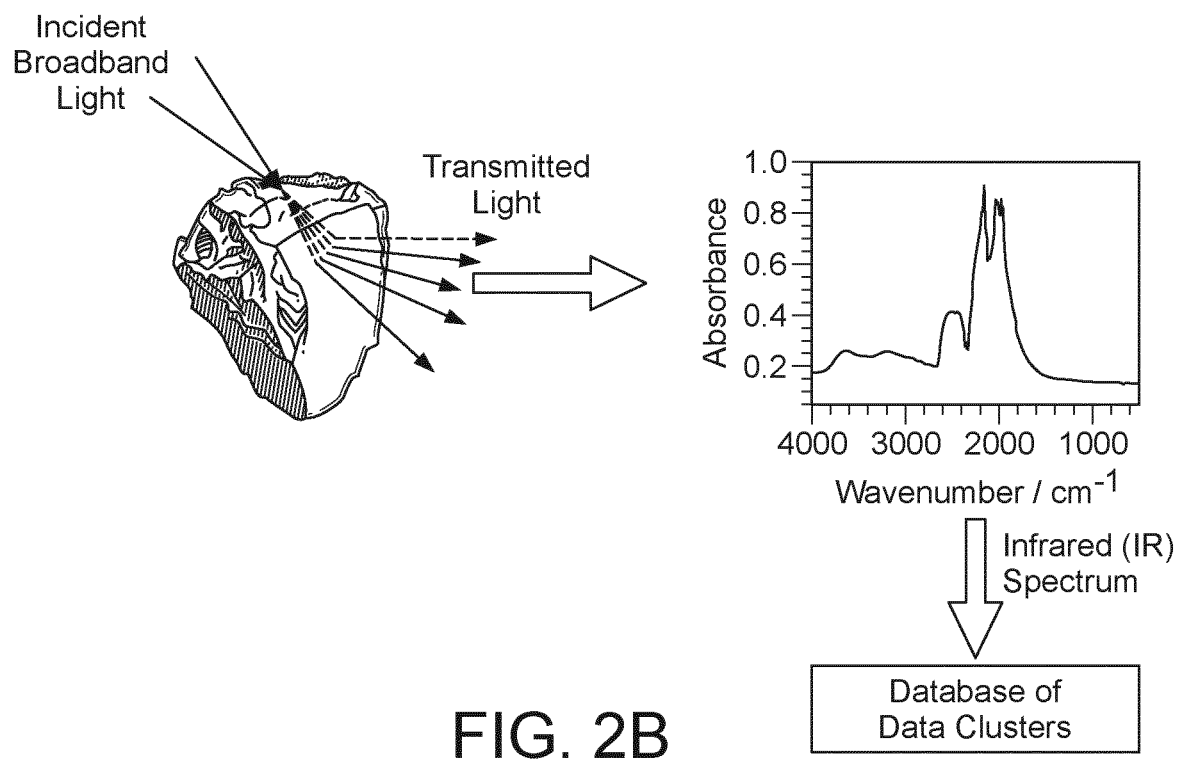
Figure 2C:
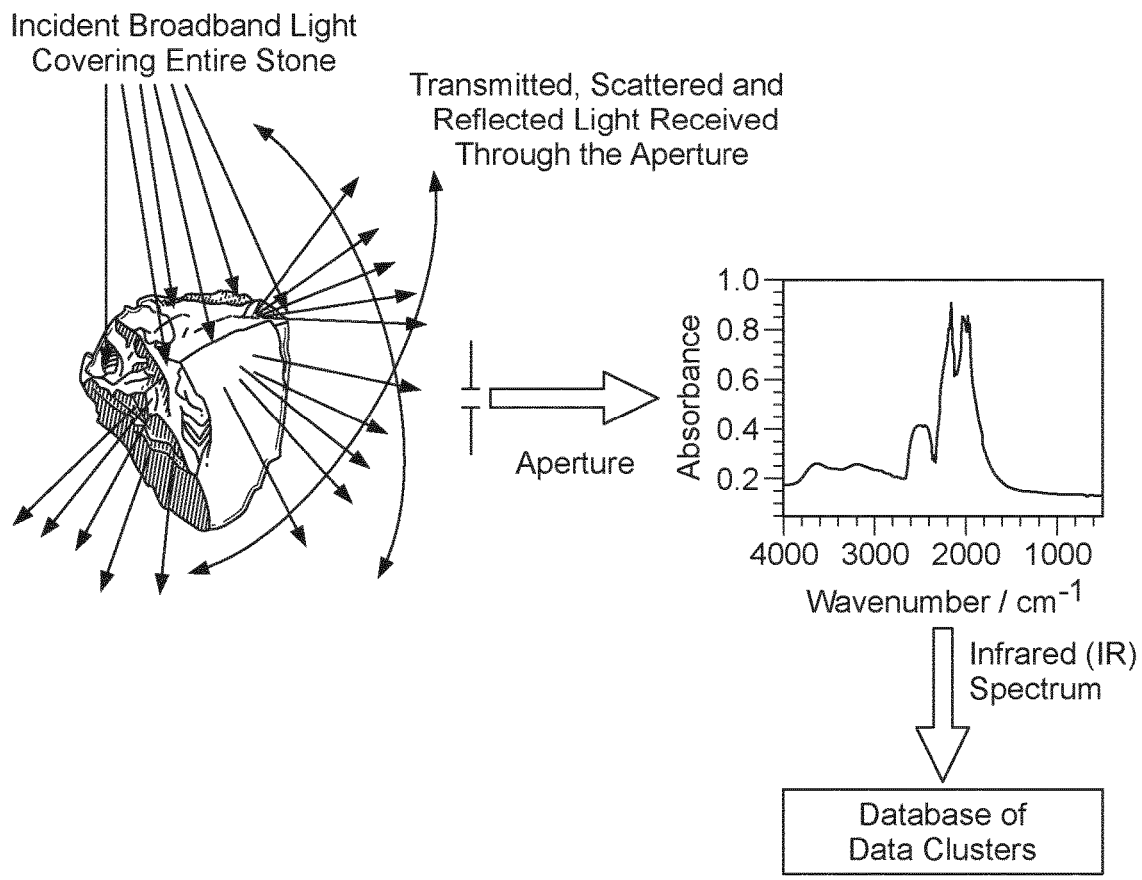
FIG. 2(C) illustrates an alternative Fourier-transform infrared spectroscopy arrangement in which an entire stone is illuminated and an aperture is used for collection.
Figure 2D:
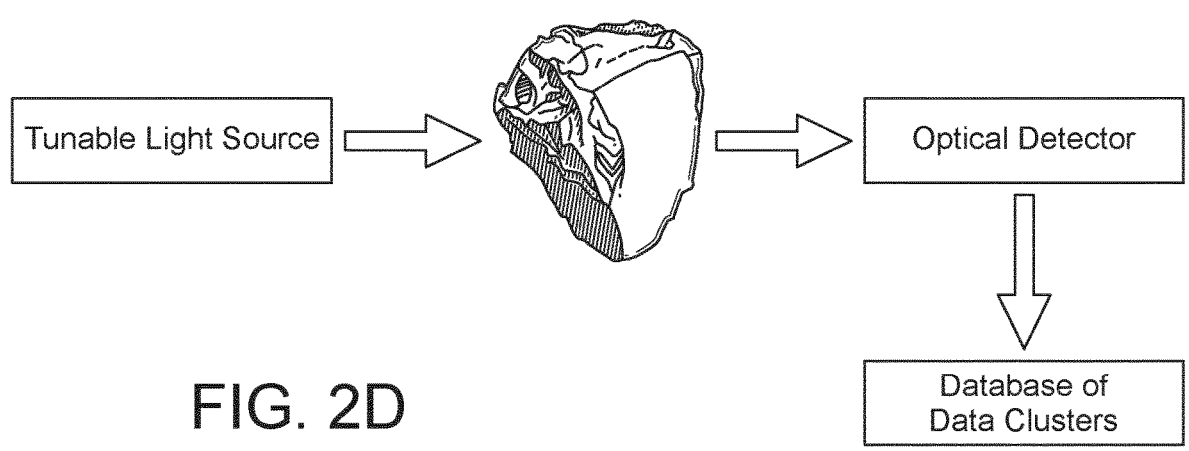
FIG. 2(D) illustrates an alternative spectroscopy arrangement in which a tunable narrow line source is used for illumination.
Figure 3:
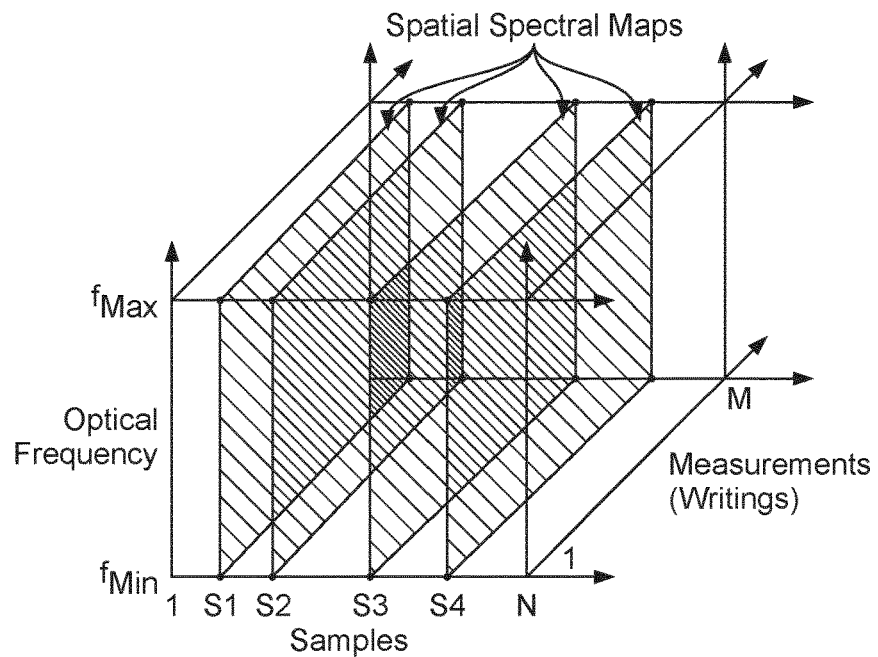
FIG. 3 schematically illustrates a data cluster of 3D spatial spectral map for N gemstones.

FIGS. 1-3 schematically illustrate a method for obtaining spectral data for one or more regions of a gemstone 10. As shown in FIG. 1(A), a broadband source 20 of electromagnetic radiation is configured to illuminate a probe volume of the gemstone 10 with incident light 30. The broadband source may comprise a laser source which generates a broadband output including infrared light. Suitable laser sources are known to those skilled in the art and will not be described in any further detail here.

As shown, the incident light 30 partially reflects and scatters from the surface and a thin layer close to the surface to produce scattered light 40, and partially passes through the gemstone 10 to produce transmitted light 50. The scattered and/or transmitted light which carries information about the unique properties of the gemstone under investigation may be spectrally analysed through Fourier Transformation (FT) spectroscopy. A suitable spectrometer 60 may be positioned to detect and analyse either the scattered light 40 or the transmitted light 50, or both, so as to provide spectral data.

In the case of gemstones, it is particularly advantageous that Fourier-transform infrared spectroscopy (FTIR) is used in either transmission or reflection mode as illustrated in FIGS. 2(A) and 2(B). Alternatively, a combination of both modes may be used to generate the spectral data. Suitable spectrometers for FTIR spectroscopy are known per se to those skilled in the art and will not be described here.

Acquired spectral data is then stored in computer memory. Then the gemstone is moved (shifted or rotated) so that the same measurement can be performed for an adjacent probe volume. This writing data process continues until preferably the spectral mapping covers the entire gemstone.

In some examples, the light from the broadband source may also be moved across the sample in addition to or as an alternative to moving the gemstone. Moreover, rather than shifting or rotating the gemstone, in some embodiments a beam may be used which interacts with the entire gemstone thickness and apertures may be used to achieve a spatially selected mapping. This is illustrated in FIG. 2(C).

In an alternative spectroscopy arrangement, a tunable source (e.g. a quantum cascade laser or a optical parametric oscillator) may be used instead of a broadband source, together with a detector (rather than a spectrometer). This is illustrated in FIG. 2(D). The wavelength of the tunable source may be varied over the desired range so as to obtain the spectral data.

Irrespective of the spectroscopy arrangement that is used to obtain it, the resulting spectral data for each region comprises a spectrum (e.g. FTIR spectrum) taken within a finite bandwidth $F=(f_{max}-f_{min})$ with given resolution $\delta f$, so that the number of spectral data points is $Q=F/\delta f$. The spectral data points represent relative intensity values at different wavelengths within the bandwidth F.

The number of such measurements M (i.e. the number of regions for which spectra are recorded) depends on gemstone dimensions and spotsize of the illumination beam at the gemstone surface For example, for a gemstone diameter of 5 mm and a writing beam size of 200 um, about 200 spectral measurements may be taken.

Figure 1B:
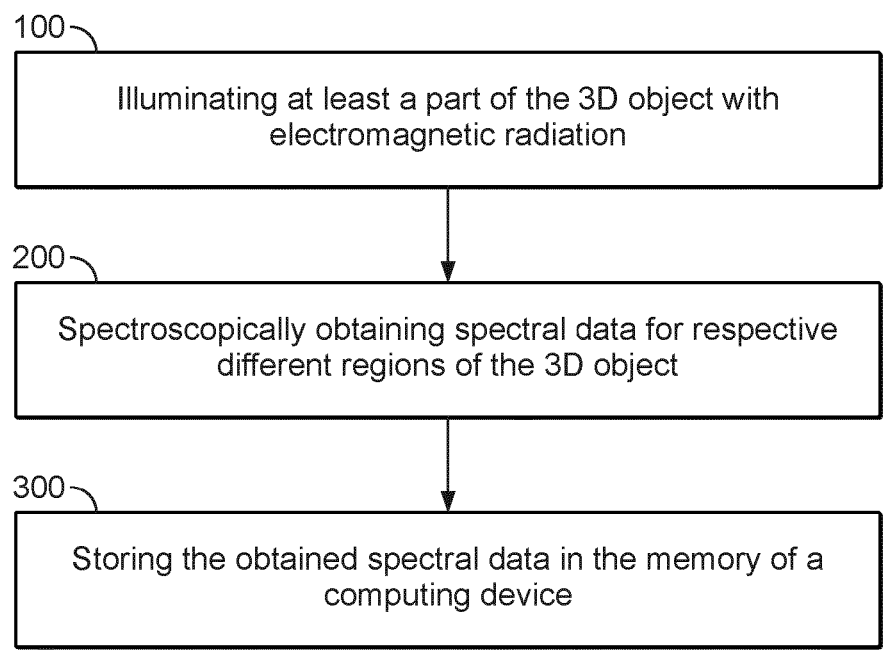
FIG. 1(B) illustrates a data acquisition method.

FIG. 1(B) summarises the data acquisition process according to an example embodiment. In step 100, at least part of the 3D object is illuminated with electromagnetic radiation. In step 200, spectral data is spectroscopically obtained for respective different regions of the 3D object. In step 300, the obtained spectral data is stored in the memory of a computing device.

Data Processing—General

Figure 10:
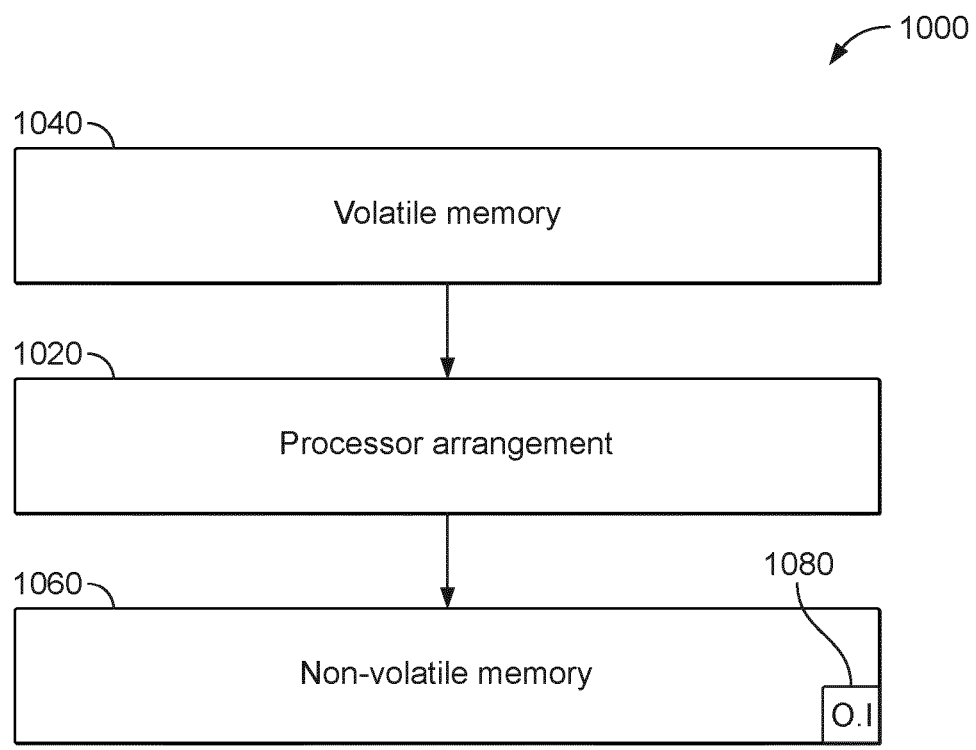
FIG. 10 is a schematic illustration of a system/apparatus for performing any of the computer-implemented methods described herein.

Various techniques for processing acquired data will be described below, e.g. in the context of training a machine learning model, testing a machine learning model, and using a trained machine learning model to make predictions. FIG. 10 is a schematic example of a system/apparatus for performing such processing. The system/apparatus shown is an example of a computing device. It will be appreciated by the skilled person that other types of computing devices/systems may alternatively be used to implement the methods described herein, such as a distributed computing system.

The apparatus (or system) 1000 comprises one or more processors 1020. The one or more processors control operation of other components of the system/apparatus 1000. The one or more processors 1020 may, for example, comprise a general purpose processor. The one or more processors 1020 may be a single core device or a multiple core device. The one or more processors 1020 may comprise a central processing unit (CPU) or a graphical processing unit (GPU). Alternatively, the one or more processors 1020 may comprise specialised processing hardware, for instance a RISC processor or programmable hardware with embedded firmware. Multiple processors may be included.

The system/apparatus comprises a working or volatile memory 1040. The one or more processors may access the volatile memory 1040 in order to process data and may control the storage of data in memory. The volatile memory 1040 may comprise RAM of any type, for example Static RAM (SRAM), Dynamic RAM (DRAM), or it may comprise Flash memory, such as an SD-Card.

The system/apparatus comprises a non-volatile memory 1060. The non-volatile memory 906 stores a set of operation instructions 1080 for controlling the operation of the processors 902 in the form of computer readable instructions. The non-volatile memory 906 may be a memory of any kind such as a Read Only Memory (ROM), a Flash memory or a magnetic drive memory. The non-volatile memory 1060 may also be used to store the data acquired using the data acquisition process summarised in FIG. 1(B).

The one or more processors 1020 are configured to execute operating instructions 1080 to cause the system/apparatus to perform any of the methods described herein. The operating instructions 1080 may comprise code (i.e. drivers) relating to the hardware components of the system/apparatus woo, as well as code relating to the basic operation of the system/apparatus woo. Generally speaking, the one or more processors 1002 execute one or more instructions of the operating instructions 1008, which are stored permanently or semi-permanently in the non-volatile memory 1006, using the volatile memory 1004 to temporarily store data generated during execution of said operating instructions 1008.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Training a Machine Learning Model

As discussed in more detail below, spectral data obtained for a set of gemstones may be used to train a machine learning model. For a set of N gemstones, the data acquisition process summarised in FIG. 1(B) may be repeated for each of the N gemstones and the resulting data may be represented in 3D space as is schematically shown in FIG. 3. In particular, as shown, each gemstone, say S1, S2, S3 . . . Sn, from the above set of N gemstones is now digitally represented by a spatial spectral map (SSM) in the "optical frequency—writings" (FW) plane. All the above SSMs form a data cluster for the gemstones set which can be stored in a computer memory. This data cluster may then be used to train a neural network to distinguish data from various FW planes.

Figure 4:
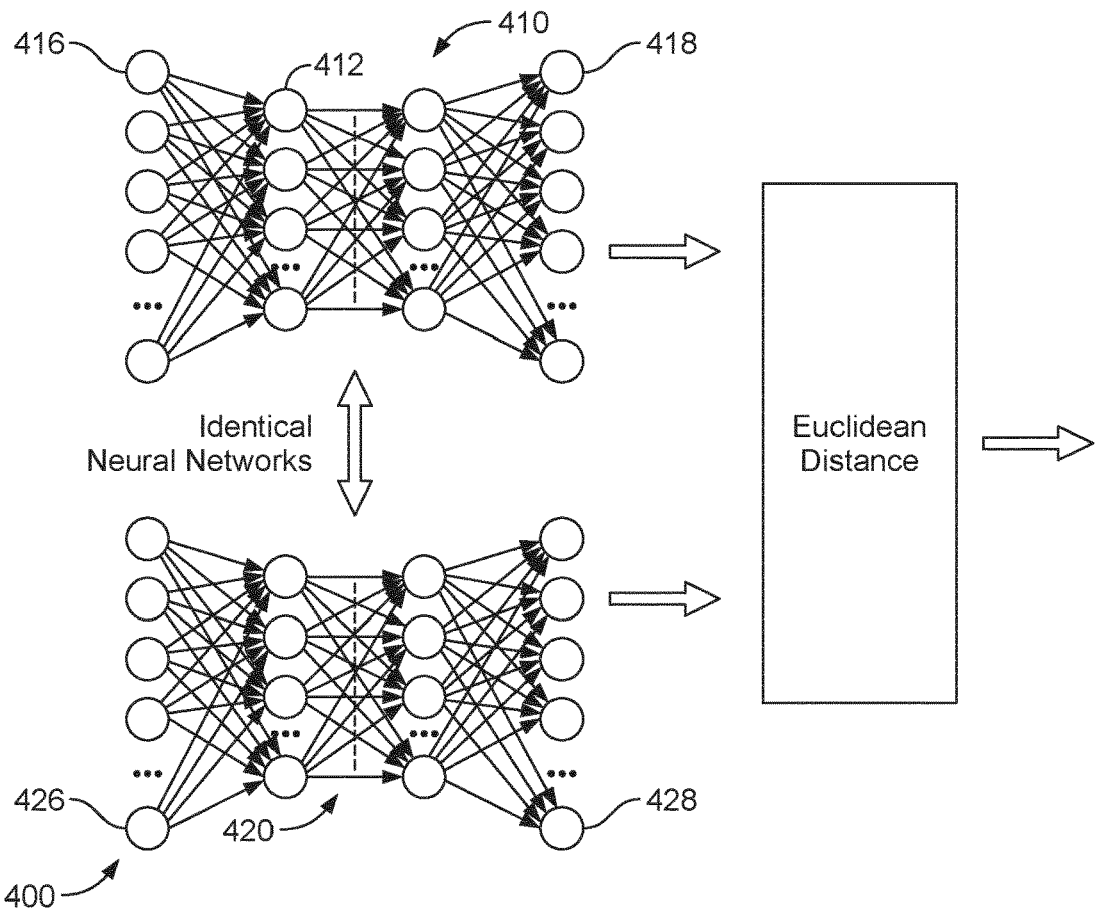
FIG. 4 schematically illustrates a Siamese neural network.

For this purpose, it is advantageous to employ a Siamese neural network (also referred to as a "twin neural network"). Siamese neural networks are known per se and will not be described in detail here. An overview of the architecture of an exemplary Siamese neural network is illustrated in FIG. 4. As shown, the network 400 comprises a first subnetwork 410 comprising first and second hidden layers and an output layer 418. Each of these layers comprises one or more nonlinear units in the form of neurons 412. As will be understood by those skilled in the art, a neuron has an associated sets of parameters (e.g. weights and biases) which determine the output of the neuron based on its inputs, and employs a suitable activation function (e.g. ReLU or other suitable nonlinear function). Each neuron in a layer calculates a weighted combination of the outputs of the preceding layer based on the current parameters for the neuron, and produces its own output in accordance with its activation function. Thus, the output of each layer is used as an input to the next layer until the output layer 418 is reached. As shown in FIG. 4, the first subnetwork 410 also includes an input layer 416 configured to receive a set of spectral data points representing a spectrum (e.g. an FTIR spectrum) as described above. For example, the input layer 416 may include a node for each spectral data point of the received spectral data, so that each node of the input layer receives a different spectral data point as input. The input layer 416 passes these values as inputs to each neuron of the first hidden layer.

In one example, the input layer may comprise 912 nodes, and the first and second hidden layers may each comprise 128 nodes (i.e. neurons). The output layer may also comprise 128 nodes (i.e. neurons). However those skilled in the art will appreciate that different number of nodes could be used in each layer, and that any suitable number of hidden layers could be used.

The network 40 also includes a second subnetwork 42o which is identical to the first subnetwork 410. Thus, the second subnetwork comprises a second set of fully connected neural network layers which has the same structure as the first subnetwork 410. Furthermore, the second subnetwork includes an input layer 426 configured to receive a set of spectral data points representing a spectrum (e.g. FTIR spectrum), and an output layer 428. As well as being identical in structure, the parameters associated with the corresponding neurons in each subnetwork 410, 420 are also the same because they are constrained to be the same during training (see below).

As discussed above, the first subnetwork 410 receives, at its input layer, spectral data in the form of a respective set of spectral data points for a particular spectrum, e.g. an FTIR spectrum captured for a particular probe volume of a particular gemstone. The number of spectral data points may be denoted by Q, and thus the spectral data may be represented by a vector having Q dimensions, wherein each component of the vector corresponds to a different spectral data point. Similarly, the second subnetwork 420 receives, at its input layer, spectral data in the form of a set of spectral data point for another spectrum, which again may comprise an FTIR spectrum have Q data points and may thus also be represented by a vector having Q dimensions.

Figure 5:
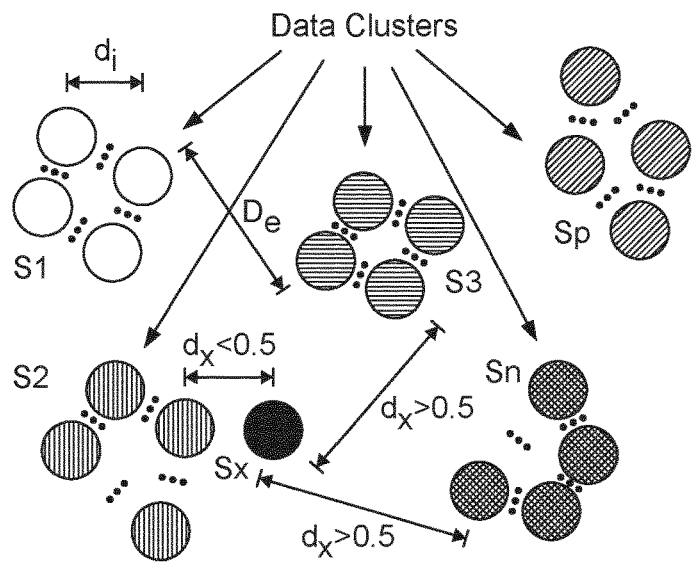
FIG. 5 illustrates the positions of spectral measurements in an optimised latent space.

The first subnetwork 410 (and therefore also the second subnetwork 420) is configured during training of the neural network 400 to learn a transformation from Q dimensional space (i.e. the space of FTIR spectra represented by Q-dimensional vectors which may be input into the first subnetwork 410) to a lower R-dimensional space(latent space) in such a way that Euclidian distances in R-dimensional space represent a measure of similarity between spectra. It will be understood that R is the size (i.e. number of neurons) in each output layer 418, 428. Specifically, the transformation is such that different measurements for the same gemstone form a close cluster of points with small Euclidian intra-cluster distance $d_i$ and which is much smaller than that between clusters for different gemstones (inter-cluster distance $D_e$). In other words during training, the neural network 400 finds the optimum latent space that maximise $D_e$ and minimises $d_i$. This is schematically illustrated in FIG. 5.

In this way the neural network 400 is configured by its training such that the Euclidean distance between the outputs of the first and second subnetworks represents a measure of similarity between the two received FTIR spectra. This Euclidean distance may be denoted by "d" and may comprise a number between 0 and infinity. The network 400 may be trained so that values of d closer to zero (i.e. short distances) are generated when the received spectra are similar, while values of d closer to 1 (i.e. longer distances) are generated when the received spectra are different.

The parameters of the neurons (weights and biases) of the network 400 form the trainable parameters of the network which are adjusted during training based on an objective function as described in more detail below.

In particular, the neural network may be trained using pairs of spectral measurements, where each spectral measurement comprises spectra data including a plurality of spectral data points, the spectral data points representing relative intensity values at different wavelengths as discussed above.

It is advantageous for training purpose to use both similar pairs, i.e. spectral measurements derived from the same gemstone, and also dissimilar pairs, i.e. spectral measurements derived from different gemstones. Any number of stones and measurements may be used, however as an illustrative example suppose there are two gemstones (S1, S2) and M=3 spectral measurements are performed on each stone (M1, M2, M3) using the data acquisition summarised in FIG. 1(B). Thus there are 6 spectral measurements in total, i.e:

S1-M1 S1-M2 S1-M3
S2-M1 S2-M2 S2-M3

Sets of similar and dissimilar pairs can thus be constructed as follows:

Similar pairs (i.e. spectral measurements from the same gemstone)
(S1-M1, S1-M2) (S1-M1, S1-M3) (S1-M2, S1-M3)
(S2-M1, S2-M2) (S2-M1, S2-M3) (S2-M2, S2-M3)

Dissimilar pairs (spectral measurements from different gemstones)
(S1-M1, S2-M1) (S1-M1, S2-M2) (S1-M1, S2-M3)
(S1-M2, S2-M1) (S1-M2, S2-M2) (S1-M2, S2-M3)
(S1-M3, S2-M1) (S1-M3, S2-M2) (S1-M3, S2-M3)

Each similar pair (same gemstone) is given the label "1", and each dissimilar pair (different gemstones) is given the label "0". Thus, each training data item comprises a labelled measurement pair.

Although the example above made use of 2 gemstones and 3 measurements per stone, it will be understood that training data may be developed using the above-described technique using any number of gemstones and measurements per stone. Moreover, it will be understood that while binary labels (1 or 0) may be used in some examples, in other examples labels may reflect more nuanced knowledge of the relationship between measurement pairs. For example, a measurement pair representing a "sibling" relationship (see below with reference to FIG. 8) may be given the value 0.1 as its label.

The Siamese neural network may be trained using the labelled training items using a supervised learning approach. The use of supervised learning to train a Siamese neural network is known per se to those skilled in the art and will not be described in detail here. Briefly, to train the neural network with the training data items, the trainable parameters of the neural network are first initialised, e.g. randomly or in accordance with a particular initialisation scheme. The neural network 400 then processes the training data items by processing the first measurements of each pair using the first subnetwork 410 and the second measurement in each pair using the second subnetwork 420. The Euclidean distance d is then calculated between the output of the first subnetwork 410 and the second subnetwork 420. If d is less than 0.5 then an identification result of "1" (similar) is output, and if d is greater than or equal to 0.5 then an identification result of "0" (dissimilar) is output.

The identification result outputs are compared with the respective labels using a suitable loss function and the parameters of the subnetworks 410 and 420 are updated based on the loss function. As will be understand by those skilled in the art the two subnetworks 410 are identical and remain identical during training. In practice only one subnetwork is trained but its parameters are used for both the first and second subnetworks.

Various loss functions suitable for training Siamese neural network will be apparent to those skilled in the art—suitable examples include contrastive loss, triplet loss and quadruplet loss. A suitable training algorithm such as stochastic gradient descent or other gradient-based method may be used to adjust the trainable parameters of the neural network to minimise the loss function, thereby training the neural network based on the training data items. It will be understood that gradient-based techniques involve calculation of the gradient of the loss function, which may be calculated using the backpropagation technique which is known to those skilled in the art and will not be described here.

In one specific example, the Adam optimizer may be used with a learning rate of 1e-4 and contrastive loss may be used. A batch size of 32 may be used and the neural network may be trained for 250 epochs. Regarding contrastive loss, reference is directed to R. Hadsell, S. Chopra and Y. LeCun, "*Dimensionality Reduction by Learning an Invariant Mapping,*" 2006 IEEE Computer Society Conference on Computer Vision and Pattern Recognition (CVPR'06), New York, NY, USA, 2006, pp. 1735-1742, doi: 10.1109/CVPR.2006.100.

Testing the Trained Model

Returning to the example of our two gemstones (S1, S2), the trained neural network may be tested using additional spectral measurements which may be obtained using the data acquisition summarised FIG. 1(B). Suppose two additional readings (r=2) are performed for each stone. These measurements (M4 and M5) represent new spectral data which the neural network did not process during training.

Thus the test items are:
S1-M4 S1-M5
S2-M4 S2-M5

The following table can then be constructed:

|  | S1-M4, S1-M5 (r = 2) | S2-M4 S2-M5 |
| --- | --- | --- |
| S1-M1 S1-M2 S1-M3 (M = 3) | 6 comparisons M * r | 6 comparisons |
| S2-M1 S2-M2 S2-M3 | 6 comparisons | 6 comparisons |

Each cell is the result of 6 comparisons. Taking the top left corner as an example these are:
(S1-M1, S1-M4) (S1-M1, S1-M5) (S1-M2, S1-M4)
(S1-M2, S1-M5) (S1-M3, S1-M4) (S1-M3, S1-M5)

Ideally, the neural network should output "1" for each comparison since they are all coming from the same stone. However, in practice the result may be different, e.g. 5 "1"s and 1 "0". The outputs are summed and normalized to 1 (i.e. averaged), so for 5 "1"s and 1 "0" the result is 5/6=83%. Repeating this process for the other cells, the result may for example be:

|  | S1-M4, S1-M5 | S2-M4 S2-M5 |
| --- | --- | --- |
| S1-M1 S1-M2 S1-M3 | 83.3% | 0% |
| S2-M1 S2-M2 S2-M3 | 16.7% | 100% |

This simplifies to:

|  | S1 | S2 |
| --- | --- | --- |
| S1 | 83.3% | 0% |
| S2 | 16.7% | 100% |

Ideally the diagonal should be 100% and the rest 0%, but in practice there may be some deviation from that ideal case e.g. as shown.

Gemstone Identification

The process of identifying an unknown gemstone using the trained neural network is in essence the same as the testing process described above. It begins with a reading process in which data is acquired for the gemstone under test using the data acquisition process summarised in FIG. 1(B), resulting in a number of FTIR spectra (i.e. a number of "readings", denoted by r) for different regions of the stone. Each FTIR spectrum is taken within a finite bandwidth $F=(f_{max}-f_{min})$ with given resolution $\delta f$, so that the number of spectral data points is $Q=F/\delta f$, the spectral data points representing relative intensity values at different wavelengths within the bandwidth F.

The unknown gemstone may then be compared with a reference gemstone for which FTIR spectra were previously obtained for various probe regions of the reference stone. The number of spectra recorded for the reference gemstone is denoted here by M.

Figure 6:
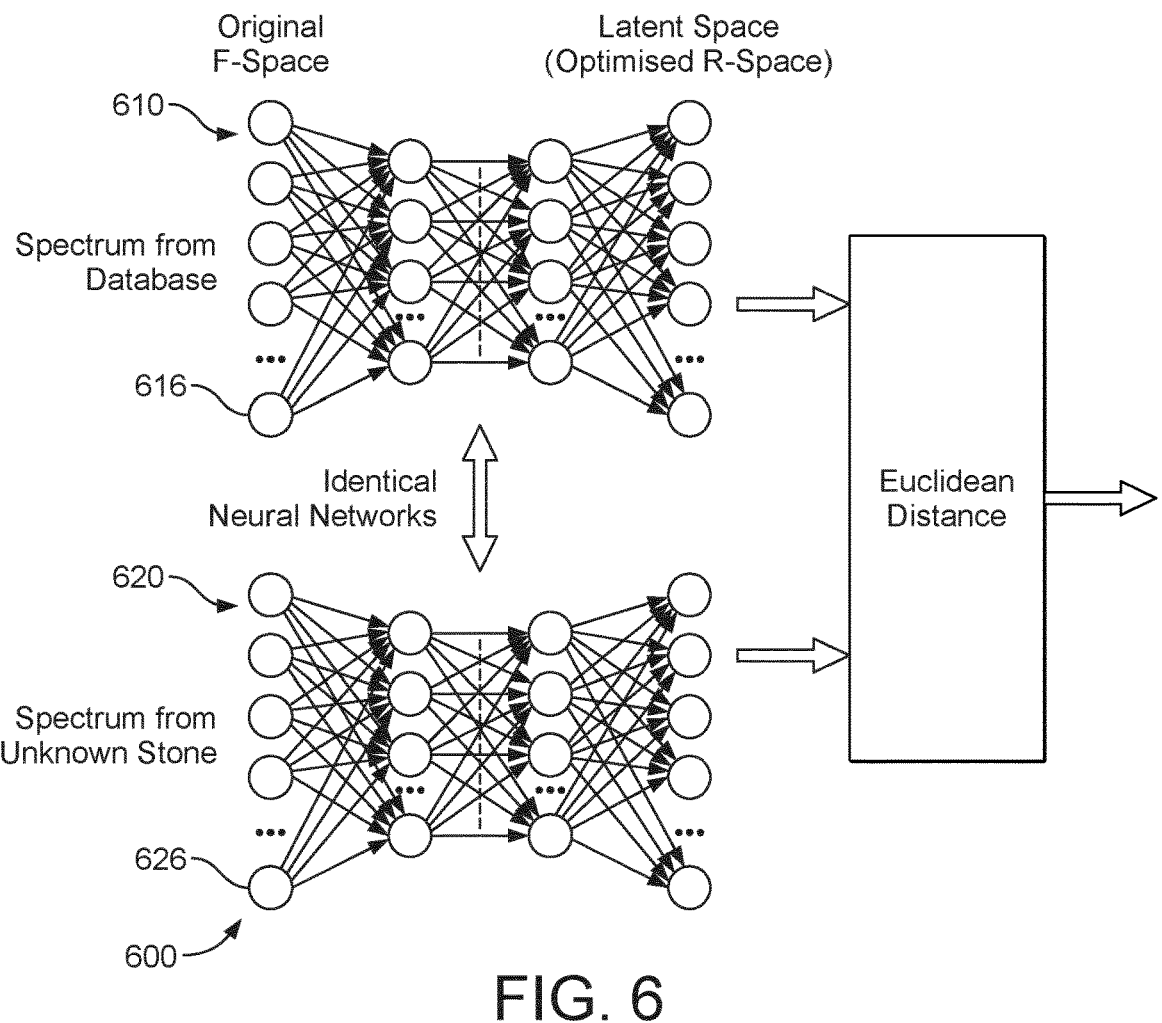
FIG. 6 illustrates the Siamese neural network of FIG. 4 after it has been trained.

FIG. 6 illustrates the neural network 600 after it has been trained by the process described above with reference to FIG. 4. As shown in FIG. 6, the first subnetwork 610 of the trained neural network 600 receives one of the FTIR spectra for the reference gemstone and the second subnetwork 620 receives one of the FTIR spectra for the unknown stone. It will be understood that as described above in connection with FIG. 4, the input layer 616 of the first subnetwork 610 may include a node for each spectral data point of the FTIR spectum that it receives, so that each node of the input layer 616 receives a different spectral data point as input. Similarly, the input layer 626 of the second subnetwork 620 may include a node for each spectral data point of the FTIR spectrum that it receives.

As shown in FIG. 6, the resulting model output from the trained neural network 600 comprises a distance d. If the distance d is less than 0.5, then a result of 1 is stored for the spectral comparison, and if the distance d is greater than or equal to 0.5, then a result of 0 is stored for the spectral comparison.

To obtain an overall identification result, all possible pairs of spectra (M*r pairs) are compared in this way using the trained neural network 600 and the results of the spectral comparison (either 1 or 0 for each comparison) are stored. These results are then summed together and normalized to 1. In other words, the results of the spectral comparison for the M*r spectral pairs are averaged to obtain the identification result. The identification result thus obtained represents a degree of similarity between the unknown stone and the reference stone.

Thus, it will be understood that the identification result is derived from the model outputs generated by comparing each of the r spectral data sets for the unknown stone with the M previously stored spectral data sets for the reference gemstone.

It will be understood also that an average is just one way that the results of the individual spectral comparison may be combined and in some cases a different function could be used to provide the identification result.

Figure 7:
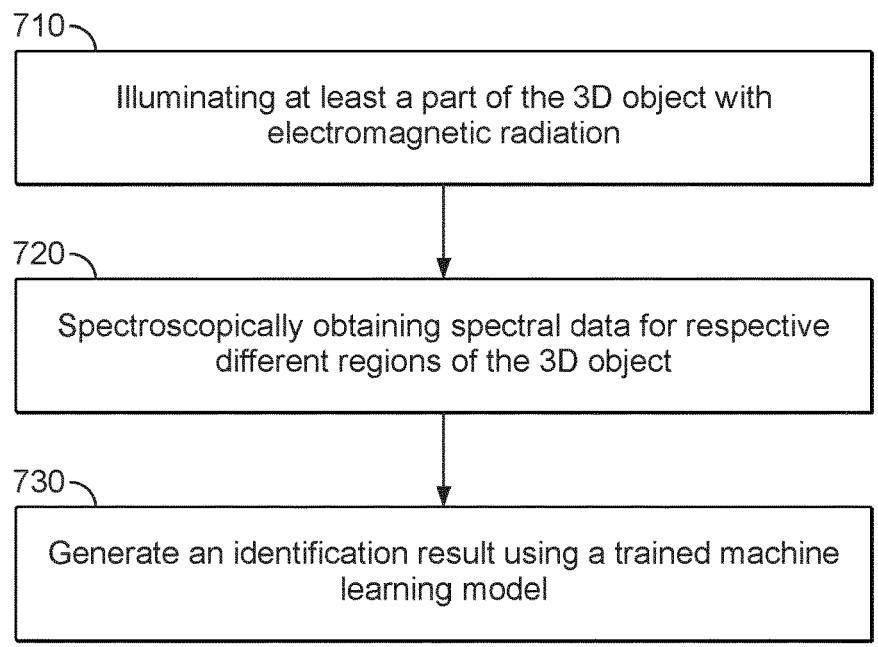
FIG. 7 illustrates a method of generating an identification result for a 3D object.

FIG. 7 summarises the gemstone identification process according to an example embodiment. In step 710, at least part of the gemstone under test is illuminated with electromagnetic radiation. In step 720, spectral data is spectroscopically obtained for one or more regions of the gemstone under test. In step 730, the trained machine learning is used to generate an identification result by comparing the obtained spectral data with stored spectral data for one or more regions of the reference stone.

Example Use Case

Figure 8:
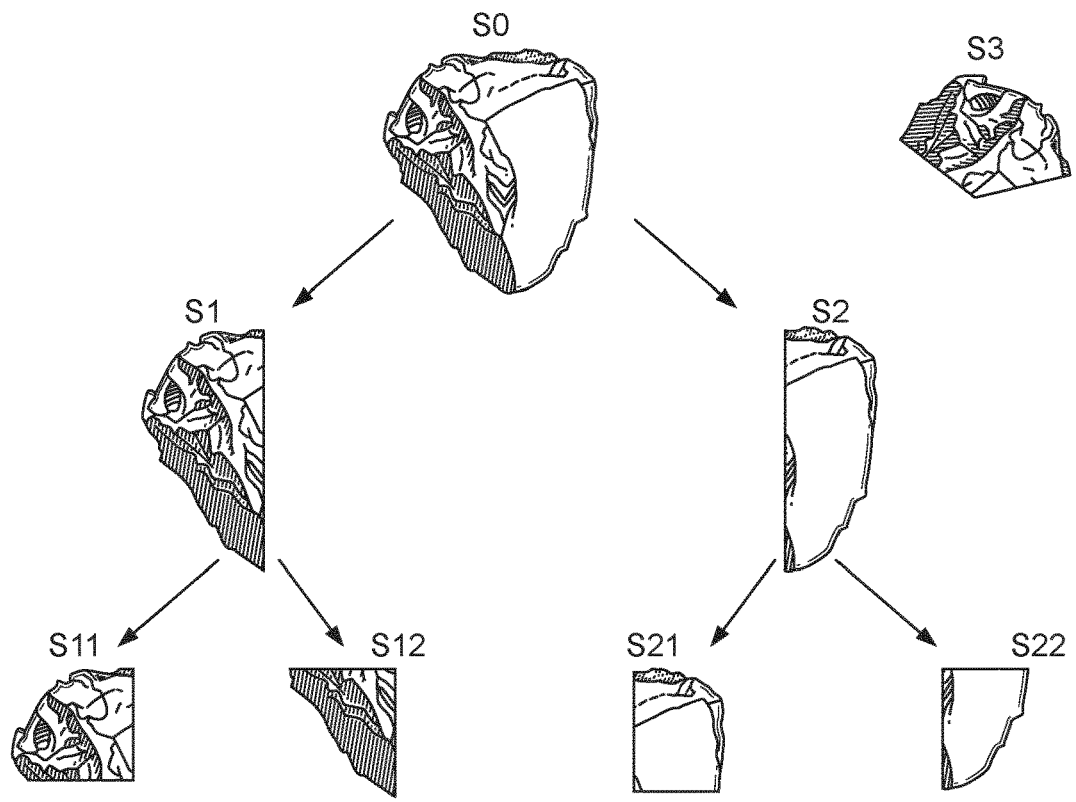
FIG. 8 illustrates a collection of gemstones.

FIG. 8 illustrate 4 gemstones S11, S12, S21, S22 which are derived from a larger original gemstone S0 via two intermediates S1, S2. A further gemstone S3 is also shown, which is standalone in that it is not related by origin to S0.

In this example, the gemstones S0, S1, S2, S11, S12, S21, S22 have undergone FTIR measurement as summarised in FIG. 1(B) at each stage from the original gemstone S0 to the second split. The gemstone S3 has also undergone FTIR measurement using the same method. Since each gemstone has been previously through the FTIR measurement procedure ("writing" process), each is associated with a spatial spectral map which represents a stored "fingerprint" for that gemstone. The collection of such spatial spectral maps may be included in a data cluster similar to that shown in FIG. 3, thereby forming a spectral fingerprint database of known gemstones.

Suppose a particular one of the gemstones S11, S12, S21, S22 and S3 is picked up without knowing which gemstone it is. The selected gemstone may be compared to the gemstones for which spectral fingerprints are available in the database using the process summarised in FIG. 1(B) to attempt to identify the gemstone and its relationship to other gemstones represented in the database. Thus, the gemstones represented in the database act as reference objects to which the selected gemstone is compared.

In particular, a small number FTIR measurements may be performed on the selected gemstone ("reading" process) using the process summarised in FIG. 1(B). The selected gemstone is then compared with each gemstone for which a spectral fingerprint is available in the database, using a machine learning model as described above with reference to FIG. 7, thereby to obtain an identification score for the selected gemstone relative to each gemstone represented in the database.

Another of the gemstones S11, S12, S21, S22 and S3 may then be picked up and the process repeated for each stone. FIG. 9(A) illustrates a table (so-called "matching table") in which the identification scores may be entered. Each cell in the above table represents a degree of proximity of gemstones from the dataset. The diagonal cells should therefore in theory represent a 100% match, with a 0% match for unrelated gemstones. If there is a relationship between gemstones, then depending on the relationship the number in cells may range from 80% for a direct relationship (parent-child Sj→Sji or sibling-sibling–Sjm→Sjn) to 40% for grandparent-child. If there is no relation between the gemstones then cell value is zero. These scores schematically shown in FIG. 9(B) by way of illustration.

Thus, it can be seen that the techniques described in this specification allow identification scores to be determined for a selected gemstone relative a plurality of gemstones for which spectral fingerprints are available, thereby not only determining whether the selected gemstone is a match for a gemstone in the database (if present), but also determining the relationship between the selected gemstone and other gemstones in the database, thereby placing the selected gemstone within its "family tree". Advantageously, the method allows identification of diamonds irrespective of their surface quality, e.g. whether they are rough or polished. In this way, the described techniques allow traceability of diamonds or other gemstones throughout the entire gemstone production and distribution process.

The training data used to train the machine learning model for determining the identification results for the stones shown in FIG. 8 may be based on FTIR measurement data obtained from those same gemstones. That is, the training data may include pairs of stored "fingerprint" data obtained during the "writing process" for the gemstones shown in FIG. 8, labelled depending on the relationship between measurement pairs, as discussed above.

However in another example, a model trained using only data derived from the stones S0, S1, S11 and S12, may be used to predict the relationship between stone S2 and S1, for example. In other words, in determining an identification result for a stone (e.g. S2), it is not essential that the model has "seen" that stone before during training.

Variations

Although a Siamese neural network may be advantageously used to identify 3D objects as described above, other neural network architectures or other types of machine learning model (e.g. random forest) may alternatively be used in some embodiments. For example, in some embodiments, a neural network may be used for identification of 3D objects which is configured to accept only a single spectrum for the object at a time and which is trained as classifier to determine whether a particular gemstone belongs to a set. Such a neural network may comprises e.g. feed-forward or convolutional layers and may be trained using a supervised learning approach. Alternatively, other types of machine learning model having a twin nature (e.g. Siamese random forest) could be used.

Moreover, although the described techniques find particular utility and advantage in the context of gemstone (e.g. diamond) identification, this specification is not limited to identification of gemstones and various other types of 3D object may be identified using the techniques described here. The 3D object may in some instances comprise a transparent object but this is not essential; the 3D object may be any suitable physical entity.

CLAUSES

This specification also provides the subject matter of the following clauses:

Clause 1. An apparatus for identifying 3D objects, comprising:
 a spectroscopy arrangement to obtain spectral data for one or more regions of a 3D object, the spectroscopy arrangement including a source of electromagnetic radiation configured for illuminating at least part of the 3D object;
 one or more processors; and
 one or more computer-readable media storing:
  a trained machine learning model configured to process the obtained spectral data for the one or more regions to generate one or more model outputs from which an identification result is derived, and
  computer readable instructions, which when executed by the one or more processors, generate the identification result using the trained machine learning model.

Clause 2. The apparatus of clause 1, wherein the trained machine learning model is further configured to process stored spectral data for one or more regions of a reference 3D object, wherein generating the identification result using the trained machine learning model comprises comparing the obtained spectral data and the stored spectral data using the trained machine learning model.

Clause 3. The apparatus of clause 1 or clause 2, wherein the trained machine learning model comprises a Siamese neural network configured to receive the spectral data for a region of the 3D object, wherein the Siamese neural network comprises:
 a first set of one or more neural network layers for processing the spectral data to determine a latent space representation of the spectral data, and
 a second set of one or more neural network layers for processing further spectral data to determine a latent space representation for the further spectral data,
 wherein generating the identification result using the trained machine learning model comprises determining a measure of distance between the latent space representation of the spectral data and the latent space representation of the further spectral data.

Clause 4. The apparatus of any one of clauses 1 to 3, wherein the source comprises a broadband source and the spectroscopy arrangement includes a spectrum analyser to obtain the spectral data for the one or more regions of the 3D object.

Clause 5. The apparatus of any one of clauses 1 to 4, wherein the source of electromagnetic radiation is configured to generate mid-infrared light.

Clause 6. A method for identification of 3D objects, comprising:
 illuminating at least part of a 3D object with electromagnetic radiation;
 spectroscopically obtaining spectral data for one or more regions of the 3D object, and
 generating, at a data processing apparatus, an identification result for the 3D object using a trained machine learning model, comprising processing the obtained spectral data for the one or more regions using the trained machine learning model to generate one or more model outputs from which the identification result is derived.

Clause 7. The method of clause 6, comprising spectroscopically obtaining a plurality of spectral data sets for a respective plurality of regions of the 3D object, wherein generating the identification result comprises comparing each of the plurality of obtained spectral data sets with a plurality of stored data sets for a plurality of respective regions of the reference 3D object.

Clause 8. The method of clause 6 or clause 7, comprising generating a plurality of identification results for the 3D object relative to a respective plurality of reference 3D objects using the trained machine learning model, wherein generating each identification result comprises comparing the obtained spectral data with respective stored spectral data for the respective reference 3D object using the trained machine learning model, thereby identifying the extent to which the 3D object is related to the plurality of reference 3D objects.

Clause 9. The method of any one of clauses 6 to 8, wherein the 3D object comprises a material which is transparent to the electromagnetic radiation.

Clause 10. The method of any one of clauses 6 to 9, wherein the 3D object is a gemstone such as a diamond.

Clause 11. The method of any one of clauses 6 to 10, comprising illuminating at least part of a 3D object using a broadband source configured to generate infrared light, wherein spectroscopically obtaining spectral data for one or more regions of the 3D object comprises spectrally analysing the transmitted or reflected radiation using Fourier-transform infrared spectroscopy.

Clause 12. A method of training a machine learning model for use in 3D object identification, comprising:
 providing training data comprising a plurality of training data items, each training data item including:
  a pair of measurements selected from a set of measurements, each measurement in the set of measurements comprising spectral data obtained for one of a plurality of 3D objects, and
  a label indicating a relationship between the pair of 3D objects corresponding to the pair of measurements;
 processing, at one or more processors, the pairs of measurements included in the training data items using the machine learning model to generate a predicted output for each training data item;
 adjusting, at the one or more processors, parameters of the machine learning model based on a loss function, wherein the loss function comprises a comparison between the predicted output for each training data item and the label for that training data item.

Clause 13. The method of clause 12, wherein the machine learning model comprises a Siamese neural network, wherein adjusting parameters of the machine learning model based on the loss function comprises optimizing the objective function using a gradient based method.

Clause 14. The method of clause 12 or clause 13, wherein providing the training data comprises performing the measurements, comprising, for each 3D object:
illuminating at least part of the 3D object with electromagnetic radiation;
spectroscopically obtaining respective spectral data for one or more regions of the 3D object, wherein spectroscopically obtaining spectral data for a region of the 3D object comprises obtaining spectral data for transmitted or reflected electromagnetic radiation transmitted by or reflected from the region.

Clause 15. A computer-readable medium storing computer-readable instructions which when executed by one or more processors causes the method of clause 12 or 13 to be performed.

Many further modifications and variations to the techniques described in this specification will be evident to those skilled in the art, which fall within the scope of the following claims.

The invention claimed is:

1. An apparatus, comprising:
a spectroscopy arrangement to obtain a plurality of spectral data sets for a plurality of respective regions of a 3D object, the spectroscopy arrangement including a source of electromagnetic radiation configured for illuminating at least part of the 3D object;
one or more processors; and
one or more computer-readable media storing:
a trained machine learning model configured to process the obtained spectral data sets to generate a plurality of respective model outputs from which an identification result is derived, each model output comprising a latent space position for a respective spectral data set, the trained machine learning model comprising a neural network model which has been trained to minimise a latent space distance between measurements for the same object and to maximise a latent space distance between measurements for different objects, and
computer readable instructions, which when executed by the one or more processors, generate the identification result using the trained machine learning model, wherein generating the identification result comprises, for each of the plurality of obtained spectral data sets, comparing the latent space position for the obtained spectral data set with latent space positions for a plurality of stored spectral data sets for a plurality of regions of a reference 3D object, wherein the identification result thereby quantifies an extent to which the 3D object is related to the reference 3D object.

2. The apparatus of claim 1, wherein the trained machine learning model comprises a Siamese neural network configured to receive the spectral data for a region of the 3D object, wherein the Siamese neural network comprises:
a first set of one or more neural network layers for processing a first spectral data set to determine a latent space representation of the first spectral data set,
wherein the first spectral data set comprises one of said stored spectral data sets, and
a second set of one or more neural network layers for processing the second spectral data set to determine a latent space representation for the second spectral data set, wherein the second spectral data set comprises one of said obtained spectral data set,
wherein generating the identification result using the trained machine learning model comprises determining a measure of distance between the latent space representation of the first spectral data set and the latent space representation of the second spectral data set.

3. The apparatus of claim 1, wherein the source comprises a broadband source and the spectroscopy arrangement includes a spectrum analyser to obtain the plurality of spectral data sets for the plurality of respective regions of the 3D object.

4. The apparatus of claim 1, wherein the source of electromagnetic radiation is configured to generate mid-infrared light.

5. A method, comprising:
illuminating at least part of a 3D object with electromagnetic radiation;
obtaining a plurality of spectral data sets for a plurality of respective regions of the 3D object, using a spectroscopy technique, and
generating, at a data processing apparatus, an identification result for the 3D object using a trained machine learning model, comprising processing the obtained spectral data sets using the trained machine learning model to generate a plurality of respective model outputs from which the identification result is derived, each model output comprising a latent space position for a respective spectral data set, the trained machine learning model comprising a neural network which has been trained to minimise a latent space distance between measurements for the same object and to maximise a latent space distance between measurements for different objects,
wherein generating the identification result comprises, for each of the plurality of obtained spectral data sets, comparing the latent space position for the obtained spectral data set with latent space positions for a plurality of stored data sets for a plurality of regions of a reference 3D object, wherein the identification result thereby quantifies an extent to which the 3D object is related to the reference 3D object.

6. The method of claim 5, wherein the 3D object comprises a material which is transparent to the electromagnetic radiation.

7. The method of claim 5, wherein the 3D object is a gemstone such as a diamond.

8. The method of claim 5, comprising illuminating at least part of a 3D object using a broadband source configured to generate infrared light, wherein spectroscopically obtaining spectral data for one or more regions of the 3D object comprises spectrally analysing the transmitted or reflected radiation using Fourier-transform infrared spectroscopy.

* * * * *